(12) United States Patent
Han et al.

(10) Patent No.: US 11,330,327 B2
(45) Date of Patent: May 10, 2022

(54) MULTIMEDIA MATERIAL PROCESSING METHOD, APPARATUS, AND MULTIMEDIA PLAYBACK DEVICE

(71) Applicant: Advanced New Technologies Co., Ltd., Grand Cayman (KY)

(72) Inventors: Zhe Han, Hangzhou (CN); Lei Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/082,826

(22) Filed: Oct. 28, 2020

(65) Prior Publication Data
US 2021/0044857 A1    Feb. 11, 2021

Related U.S. Application Data

(63) Continuation of application No. PCT/CN2019/095257, filed on Jul. 9, 2019.

(30) Foreign Application Priority Data

Aug. 24, 2018 (CN) .......................... 201810972512.2

(51) Int. Cl.
*H04N 21/437*    (2011.01)
*H04N 21/239*    (2011.01)
(Continued)

(52) U.S. Cl.
CPC ....... *H04N 21/437* (2013.01); *H04N 21/2393* (2013.01); *H04N 21/26258* (2013.01);
(Continued)

(58) Field of Classification Search
None
See application file for complete search history.

(56) References Cited

U.S. PATENT DOCUMENTS

2001/0042249 A1* 11/2001 Knepper ............ H04N 21/6125
725/42
2002/0108115 A1* 8/2002 Palmer ............. H04N 21/26258
725/50
(Continued)

FOREIGN PATENT DOCUMENTS

CN           1581973        5/2005
CN         101079721       11/2007
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Jason K Lin
(74) *Attorney, Agent, or Firm* — Fish & Richardson P.C.

(57) ABSTRACT

Disclosed herein are methods, systems, and apparatus, including computer programs encoded on computer storage media, for multimedia playback. One of the methods includes: receiving, by a multimedia playback device from a multimedia server, a list indicating a plurality of multimedia files; caching, by the multimedia playback device, the plurality of multimedia files in a cache storage of the multimedia playback device; requesting, by the multimedia playback device from the multimedia server, an indication of a primary multimedia file to be played by the multimedia playback device; determining, by the multimedia playback device, a secondary multimedia file from the plurality of multimedia files to be played by the multimedia playback device; and playing, by the multimedia playback device, the secondary multimedia file when a playback condition of playing the secondary multimedia file is satisfied.

24 Claims, 5 Drawing Sheets

(51) Int. Cl.
*H04N 21/262* (2011.01)
*H04N 21/433* (2011.01)
*H04N 21/45* (2011.01)
*H04N 21/472* (2011.01)

(52) U.S. Cl.
CPC ..... *H04N 21/4331* (2013.01); *H04N 21/4532* (2013.01); *H04N 21/47217* (2013.01)

(56) References Cited

U.S. PATENT DOCUMENTS

| | | |
|---|---|---|
| 2003/0078838 A1 | 4/2003 | Szmanda |
| 2004/0097143 A1* | 5/2004 | Iwasaki ............ H04N 21/4135 439/894 |
| 2004/0244055 A1* | 12/2004 | Takada ............. H04N 7/17318 725/134 |
| 2005/0155070 A1 | 7/2005 | Slaughter |
| 2006/0013554 A1* | 1/2006 | Poslinski .......... H04N 21/4828 386/250 |
| 2007/0006077 A1* | 1/2007 | Grubbs ............ H04N 21/4722 715/716 |
| 2008/0046920 A1* | 2/2008 | Bill ................... H04N 21/222 725/34 |
| 2009/0193101 A1 | 7/2009 | Munetsugu et al. |
| 2009/0197616 A1 | 8/2009 | Lewis et al. |
| 2012/0036105 A1 | 2/2012 | Souza et al. |
| 2015/0018992 A1* | 1/2015 | Griffiths ............ H04N 21/436 700/94 |
| 2016/0269688 A1* | 9/2016 | Gardner ........... H04N 21/26225 |
| 2016/0360299 A1* | 12/2016 | Yang ................. H04N 21/6587 |
| 2017/0270560 A1* | 9/2017 | Duggal ............. H04N 21/8547 |
| 2017/0289596 A1* | 10/2017 | Krasadakis .......... H04W 4/029 |
| 2018/0253503 A1 | 9/2018 | Gao et al. |

FOREIGN PATENT DOCUMENTS

| | | |
|---|---|---|
| CN | 109566296 | 12/2009 |
| CN | 102006522 | 4/2011 |
| CN | 102739797 | 10/2012 |
| CN | 103106602 | 5/2013 |
| CN | 103902973 | 7/2014 |
| CN | 104038808 | 9/2014 |
| CN | 108038808 | 9/2014 |
| CN | 104504588 | 4/2015 |
| CN | 105049895 | 11/2015 |
| CN | 105635763 | 6/2016 |
| CN | 105847945 | 8/2016 |
| CN | 105869005 | 8/2016 |
| CN | 105871984 | 8/2016 |
| CN | 106162248 | 11/2016 |
| CN | 106658054 | 5/2017 |
| CN | 107197360 | 9/2017 |
| CN | 108989853 | 12/2018 |
| JP | 2008076539 | 4/2008 |
| JP | 2012227613 | 11/2012 |
| KR | 20130091543 | 8/2013 |

OTHER PUBLICATIONS

Nakamoto, "Bitcoin: A Peer-to-Peer Electronic Cash System," www.bitcoin.org, 2005, 9 pages.
International Search Report and Written Opinion in International Application No. PCT/CN2019/095257, dated Oct. 8, 2019, 9 pages (with partial English Translation).
PCT International Preliminary Report on Patentability in International Application No. PCT/CN2019/095257, dated Mar. 2, 2021, 11 pages (with English translation).
Extended European Search Report in European Application No. 19850984.6, dated Aug. 6, 2021, 8 pages.

* cited by examiner

MULTIMEDIA MATERIAL PROCESSING METHOD, APPARATUS, AND MULTIMEDIA PLAYBACK DEVICE

CROSS-REFERENCE TO RELATED APPLICATIONS

This application is a continuation of PCT Application No. PCT/CN2019/095257, filed on Jul. 9, 2019, which claims priority to Chinese Patent Application No. 201810972512.2, filed on Aug. 24, 2018, and each application is hereby incorporated by reference in its entirety.

TECHNICAL FIELD

Implementations of the present specification relate to the field of advertising media technologies, and in particular, to multimedia material processing methods and apparatuses and multimedia playback devices.

BACKGROUND

Multimedia playback devices (such as billboards) disposed in public places are common advertisement information propagation platforms. Currently, most multimedia playback devices use paper advertisement materials. Therefore, advertisement content is fixed and cannot be configured in real time. A small quantity of multimedia playback devices use video advertisement materials. However, this type of multimedia playback device locally pre-stores a certain quantity of video advertisement materials and then plays the video advertisement materials in a continuous loop. Consequently, like the paper advertisement materials, the video advertisement materials cannot be configured in real time.

It can be seen that currently, the multimedia playback device cannot flexibly configure the advertisement content. As a result, the advertisement content is not targeted at either a time dimension or a user dimension, and consequently advertising effectiveness is not high.

SUMMARY

An object of the implementations of the present specification is to provide multimedia material processing methods and apparatuses and multimedia playback devices, so as to implement flexible configuration of playback content of the multimedia playback device, so that the playback content of the multimedia playback device is more targeted.

To achieve the previous objective, the following technical solutions are used in the implementations of the present specification.

According to a first aspect, implementations of the present specification provide a multimedia material processing method, including: obtaining a cache list sent by a service device, where the cache list indicates a to-be-cached multimedia material; caching the to-be-cached multimedia material; requesting the service device to determine a target multimedia material, where the target multimedia material is a to-be-played multimedia material; and re-determining the target multimedia material from the cached multimedia material if the target multimedia material fails to be determined or the target multimedia material is successfully determined but the target multimedia material is not cached.

According to a second aspect, a multimedia material processing apparatus is provided, including: an obtaining module, configured to obtain a cache list sent by a service device, where the cache list indicates a to-be-cached multimedia material; a caching module, configured to cache the to-be-cached multimedia material; a request module, configured to request the service device to determine a target multimedia material, where the target multimedia material is a to-be-played multimedia material; and a determining module, configured to re-determine the target multimedia material from the cached multimedia material if the target multimedia material fails to be determined or the target multimedia material is successfully determined but the target multimedia material is not cached.

According to a third aspect, a multimedia playback device is provided, including a memory, a processor, and a computer program that is stored in the memory and that can run on the processor, where the computer program is executed by the processor to: obtain a cache list sent by a service device, where the cache list indicates a to-be-cached multimedia material; cache the to-be-cached multimedia material; request the service device to determine a target multimedia material, where the target multimedia material is a to-be-played multimedia material; and re-determine the target multimedia material from the cached multimedia material if the target multimedia material fails to be determined or the target multimedia material is successfully determined but the target multimedia material is not cached.

According to a fourth aspect, a computer readable storage medium is provided, where the computer readable storage medium stores a computer program, and when the computer program is executed by a processor, the following steps are implemented: obtaining a cache list sent by a service device, where the cache list indicates a to-be-cached multimedia material; caching the to-be-cached multimedia material; requesting the service device to determine a target multimedia material, where the target multimedia material is a to-be-played multimedia material; and re-determining the target multimedia material from the cached multimedia material if the target multimedia material fails to be determined or the target multimedia material is successfully determined but the target multimedia material is not cached.

The at least one technical solution used in the implementations of the present specification can achieve the following beneficial effects:

In the implementations of the present specification, the service device is responsible for configuring the to-be-cached multimedia material and the to-be-played multimedia material for the multimedia playback device, so that the multimedia playback device can be controlled based on certain policy to more specifically select playback content for playing in a time dimension and a user dimension, thereby improving playback effectiveness. In addition, when the multimedia playback device cannot determine the to-be-played multimedia material by using the service device, or when the to-be-played multimedia material determined by the service device is not cached by the multimedia playback device, the multimedia playback device can independently select the to-be-played multimedia material from the cached multimedia material without help of the service device, so as to ensure that the playback content is not interrupted.

BRIEF DESCRIPTION OF DRAWINGS

To describe technical solutions in implementations of the present specification or in the existing technology more clearly, the following briefly describes the accompanying drawings needed for describing the implementations or the existing technology. Clearly, the accompanying drawings in the following descriptions merely show some implementa

DESCRIPTION OF IMPLEMENTATIONS

To make the objectives, technical solutions, and advantages of the implementations of the present specification clearer, the following clearly describes the technical solutions of the implementations of the present specification with reference to specific implementations and corresponding accompanying drawings of the present specification. Clearly, the described implementations are merely some but not all of the implementations of the present specification. All other implementations obtained by a person of ordinary skill in the art based on the implementations of the present specification without creative efforts shall fall within the protection scope of the implementations of the present specification.

As described above, advertisement content of an existing billboard is fixed, and the advertisement content on the billboard cannot be flexibly changed. As a result, advertisement propagation is not specific, and consequently advertising effectiveness is not high. The present specification provides a solution to alleviate this problem.

Figure 1:
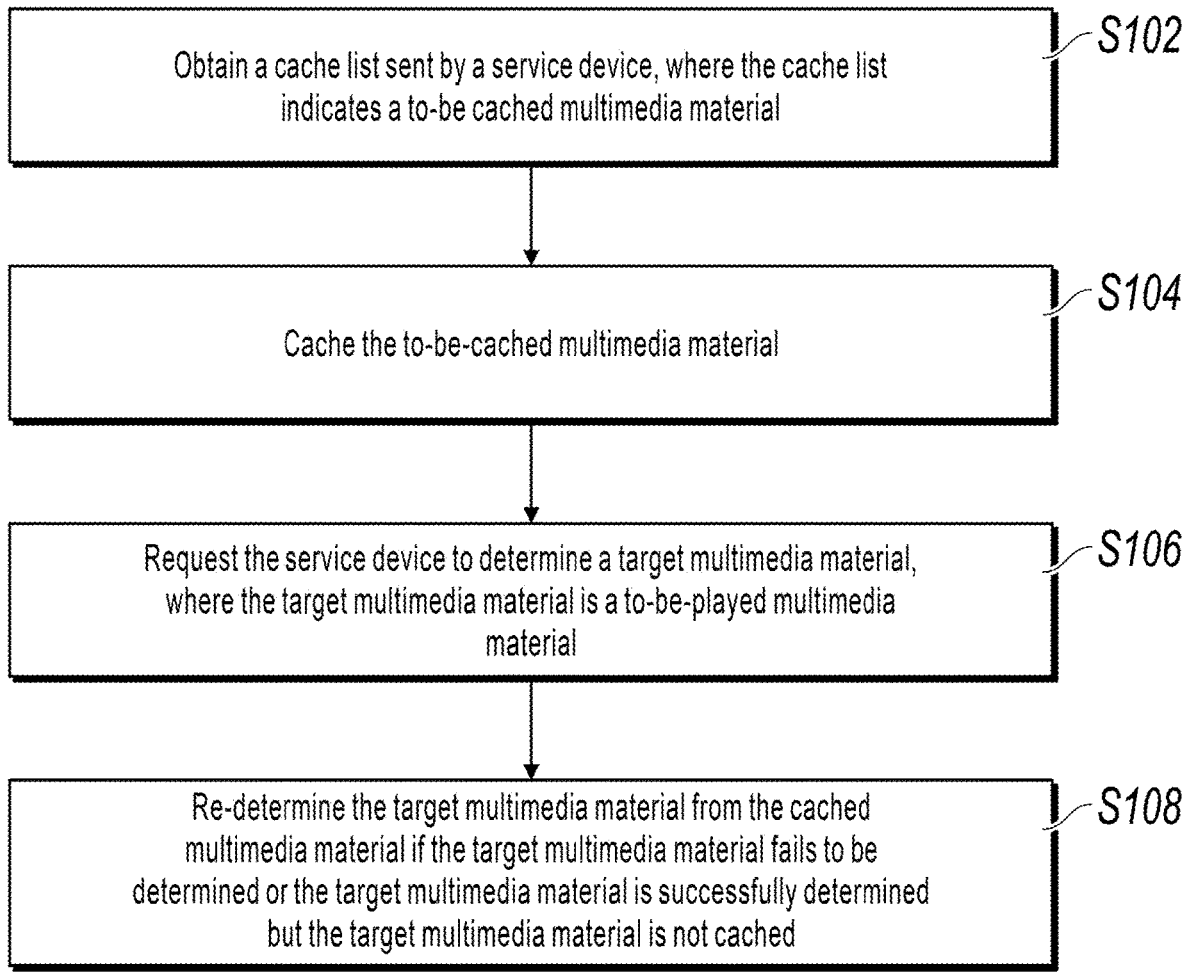
- FIG. 1 is a schematic diagram illustrating main steps of a multimedia material processing method, according to an implementation of the present specification.

According to an aspect, implementations of the present specification provide multimedia material processing methods applied to a multimedia playback device (which can include but is not limited to the billboard). As shown in FIG. 1, the processing method includes the following steps:

Step S102: Obtain a cache list sent by a service device, where the cache list is used to indicate a to-be-cached multimedia material.

For step S102, it should be understood that the cache list can indicate one or more to-be-cached multimedia materials.

The multimedia playback device can periodically or regularly send a cache request to the service device.

The service device can feed back, based on the cache request, a cache list of multimedia materials requiring multimedia material update to the multimedia playback device.

The multimedia material can be a picture material, an audio material, a video material, etc. The multimedia material not only can be used for advertisement promotion, but also can be used for public service propaganda, event reminding, etc. The present specification does not impose any restriction on the multimedia material.

Step S104: Cache the to-be-cached multimedia material.

For step S104, the multimedia playback device can download the to-be-cached multimedia material by using a network.

After the downloading is completed, the multimedia playback device can perform integrity check on a downloaded file of the multimedia material.

The multimedia playback device cache the multimedia material after the check is passed, so as to ensure that the multimedia playback device can normally play the multimedia material.

In addition, the multimedia playback device can cache the multimedia material in a local memory, or can cache the multimedia material in an external memory connected to the multimedia playback device. The cache form is not limited in the present specification.

Step S106: Request the service device to determine a target multimedia material, where the target multimedia material is a to-be-played multimedia material.

For step S106, optionally, the multimedia playback device can request the service device to determine the to-be-played target multimedia material when a remaining playback time corresponding to a currently played multimedia material reaches a predetermined execution condition.

For example, the multimedia playback device requests the service device to determine the to-be-played target multimedia material when the remaining playback time corresponding to the currently played multimedia material is less than one minute.

In the present step, the target multimedia material is determined by the service device.

Therefore, the service device can determine, based on certain policy, the target multimedia material to be played by the multimedia playback device, for example, determine the to-be-played target multimedia material based on traffic flow and population distribution near the multimedia playback device.

It is worthwhile to note that the target multimedia material in some implementations of the present application can be obtained through caching by the multimedia playback device based on the cache list sent by the service device.

Step S108: Re-determine the target multimedia material from the cached multimedia material if the target multimedia material fails to be determined or the target multimedia material is successfully determined but the target multimedia material is not cached.

For step S108, if the multimedia playback device cannot establish interaction with the service device, or does not cache the target multimedia material assigned by the service device, the multimedia playback device has no multimedia material to be played subsequently, that is, the target multimedia material fails to be determined. To avoid playback interruption, when the previous case occurs, the multimedia playback device can determine the target multimedia material from the cached multimedia material.

In some implementations of the present application, the service device is responsible for configuring the to-be-cached multimedia material and the to-be-played multimedia material for the multimedia playback device, so that the multimedia playback device can be controlled based on certain policy to more specifically select playback content for playing in a time dimension and a user dimension, thereby improving playback effectiveness. In addition, when the multimedia playback device cannot determine the to-be-played multimedia material by using the service device, or when the to-be-played multimedia material determined by the service device is not cached by the multimedia playback device, the multimedia playback device can independently select the to-be-played multimedia material from the cached multimedia material without help of the service device, so as to ensure that the playback content is not interrupted.

Further, after the to-be-played target multimedia material is determined, the processing method in implementations of the present application further includes the following step.

Step 110: Play the target multimedia material when a playback condition of the target multimedia material is satisfied.

For example, the target multimedia material in this implementation of the present application can be a next multimedia material to be played by the multimedia playback device. Correspondingly, the playback condition of the target multimedia material is satisfied when a multimedia material currently played by the multimedia playback device ends.

The processing method in this implementation of the present application is described below in detail.

Optionally, in implementations of the present application, the cache list sent by the service device to the multimedia playback device can include download information and playback information of the multimedia material.

The download information is information needed by the multimedia playback device to download the multimedia material, and can be a resource address, a resource link, etc. of the multimedia material. The playback information is information needed by the multimedia playback device to play the multimedia material, and can be playback configuration of the multimedia material. The service device can formulate the playback information based on certain policy, so as to control playback of the multimedia playback device.

When performing step S104, the multimedia playback device can download multimedia data of the to-be-cached multimedia material based on the download information of the to-be-cached multimedia material, and then associate and cache the multimedia data and the playback information of the to-be-cached multimedia material for the to-be-cached multimedia material.

The target multimedia material can be obtained through caching in step S104. Therefore, when the target multimedia material is played, the cached multimedia data of the target multimedia material can be played based on the cached playback information of the target multimedia material.

In a feasible playback solution, a playback interface of the multimedia playback device in implementations of the present application can be divided into at least one rendering block, and different rendering blocks correspond to different playback areas in the playback interface. Different playback areas can have the same size or different sizes. Different rendering blocks of the multimedia playback device can play different multimedia materials at the same moment.

In addition, the playback information of the multimedia material is used to indicate a rendering block corresponding to the multimedia data of the multimedia material. To be specific, the rendering block in the playback interface is responsible for playing multimedia data of a multimedia material corresponding to the rendering block.

Therefore, when the target multimedia material is played, in some implementations of the present application, a rendering block corresponding to the target multimedia material can be determined based on the cached playback information of the target multimedia material, and then a playback address of the rendering block corresponding to the target multimedia material is set to a cache address of the multimedia data of the target multimedia material, so that the rendering block corresponding to the target multimedia material plays the cached multimedia data of the target multimedia material.

Based on the previous configuration, the multimedia playback device can be controlled to simultaneously play a plurality of multimedia materials.

In actual applications, each rendering block can be considered as an independent playback unit. In implementations of the present application, a multimedia material that needs to be cached and the to-be-played target multimedia material are configured by using the playback unit as a granularity. Because an offline playback method is used, video data does not need to be requested from a network in real time for each playback unit during play. Even if the multimedia playback device simultaneously plays a plurality of multimedia materials, a pause phenomenon does not occur, and use experience is fairly good.

In addition, it should be understood that when the target multimedia material cannot be determined by using the service device, the target multimedia material locally selected by the multimedia playback device needs to be reasonable.

Therefore, the service device can indicate a playback constraint condition of the multimedia material by using the playback information of the multimedia material, so that when independently selecting the target multimedia material, the multimedia playback device selects, from the cached multimedia material, a multimedia material satisfying the playback constraint condition as the target multimedia material.

For example, the multimedia playback device should avoid selecting a multimedia material conflicting with the currently played multimedia material as the target multimedia material for playing.

For example, from an advertisement science perspective, a multimedia material corresponding to Coca-Cola is in a playback conflict with a multimedia material corresponding to Pepsi-Cola. If the multimedia playback device currently plays the multimedia material corresponding to Coca-Cola, the multimedia material corresponding to the Pepsi-Cola should not be selected as the next target multimedia material to be played.

Therefore, the playback information of the multimedia material in the cache list in implementations of the present application further indicates a conflicted multimedia material set formed by multimedia material conflicted with said multimedia material. After caching the multimedia data of the multimedia material, the multimedia playback device can further associate and cache, based on the cache list, information about the conflicted multimedia material set formed by multimedia material conflicted with said multimedia material.

Optionally, in this case, step S108 can be specifically implemented as follows: determining, based on the cached playback information of a currently played multimedia material, a conflicted multimedia material set formed by the currently played multimedia material conflicted with said multimedia material; and determining the to-be-played target multimedia material from the cached multimedia material that does not belong to the conflicted multimedia material set.

In another example, the multimedia playback device should independently select a multimedia material suitable for a current time period as the target multimedia material.

For example, in a daytime period, to achieve better playback effectiveness, the multimedia playback device should select a multimedia material suitable for the daytime period as the target multimedia material instead of a multimedia material suitable for a nighttime period as the target multimedia material.

Therefore, the playback information of the multimedia material in the cache list in implementations of the present application further indicates a playback time period of the multimedia material. After caching the multimedia data of the multimedia material based on the cache list, the multimedia playback device can further associate and cache information about the playback time period of the multimedia material based on the cache list.

When step S108 is performed, a playback time period of the cached multimedia material is determined based on the playback information of the cached multimedia material, and then a multimedia material whose playback time period matching a current time is selected as the target multimedia material.

It can be seen that in implementations of the present application, even if the multimedia playback device cannot determine the target multimedia material by using the service device, the multimedia playback device can independently select a proper target multimedia material for subsequent playback based on a playback policy provided by the service device.

In addition, in implementations of the present application, the service device can further control the multimedia playback device to perform offline processing on the cached multimedia material.

To be specific, in the processing method in implementations of the present application, an offline list sent by the service device can be further obtained. The offline list indicates a multimedia material to be taken offline by the multimedia playback device. Then multimedia data corresponding to the multimedia material to be taken offline in the multimedia data cached by the multimedia playback device is disabled, and corresponding offline processing such as deletion processing is performed.

Further, when the offline list sent by the service device is obtained, whether the multimedia material to be taken offline is the currently played multimedia material can be determined in implementations of the present application. If the multimedia material to be taken offline is the currently played multimedia material, the multimedia playback device stops playing the multimedia material to be taken offline, and selects the target multimedia material from a cached multimedia material that would not be taken offline, so that after stopping playing the multimedia material to be taken offline, the multimedia playback device starts to play the target multimedia material to avoid interruption of playback content.

In addition, to ensure that the service device can specifically determine the target multimedia material, in the processing method in implementations of the present application, information about a user near the multimedia playback device can be further collected when the multimedia playback device plays the multimedia material, so as to serve as a reference basis for determining the target multimedia material.

In a feasible solution, access information of a wireless network near the multimedia playback device can be obtained, and then the information about the user accessing the wireless network is obtained based on the access information; and the multimedia playback device associates and records user information and the multimedia material played at a time corresponding to the user information.

In actual applications, a sensor such as a WiFi probe of the wireless network can be deployed to count a quantity of mobile devices near the multimedia playback device, so as to estimate a quantity of people around the multimedia playback device, and determine the traffic flow in each time period of each day. Matching is performed by using a database at a cloud end (a mac address of each user's mobile phone is pre-stored in the database) to determine users appearing in front of the material screen, and further obtain pictures of users browsing a current multimedia material.

Based on the previous information, the service device can selectively deliver the multimedia material to the multimedia playback device or put the multimedia material offline, so that the multimedia playback device caches and plays a multimedia material with relatively good financial return, and disables and deletes a multimedia material with relatively poor return.

For example, if the service device determines, based on the information, that a multimedia material can attract a relatively large quantity of users to watch in a daytime period, it is determined that the multimedia material is suitable for playing in the daytime period. When the service device subsequently sends the cache list of the multimedia material to the multimedia playback device, the playback information of the multimedia material indicates that a playback time period of the multimedia material is the daytime period, so that the multimedia playback device prioritizes the multimedia material as the to-be-played target multimedia material in the daytime period.

In addition, based on the previous, in the processing method in implementations of the present application, a task event of caching the multimedia material, a task event of playing the multimedia material, and a task event of obtaining the information about the user accessing the wireless network can be further recorded and sent to the service device.

The task event includes specific content of the event, a starting time of the event, and an end time of the event. The service device can perform reconciliation based on the task event, or formulate a selection policy of the target multimedia material based on the task event. In addition, when the multimedia playback device cannot determine the target multimedia material by using the service device, the multimedia playback device can determine the to-be-played target multimedia material from the cached multimedia material based on the locally recorded task event.

A main procedure in specific implementation of the processing method in the implementations of the present application is described below in detail.

Figure 2:
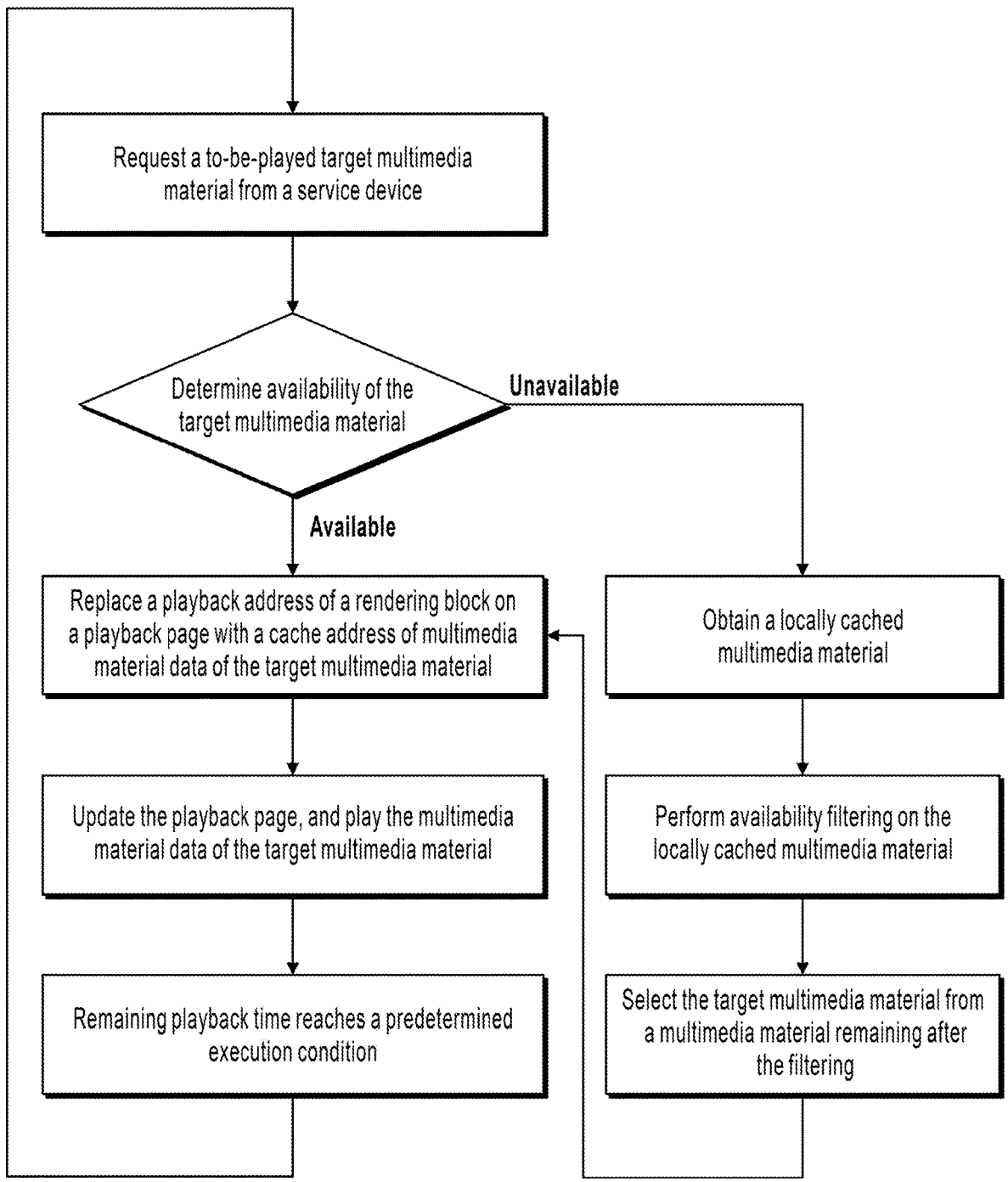
FIG. 2 is a schematic diagram illustrating a procedure of a multimedia material processing method in practice, according to an implementation of the present specification.

As shown in FIG. 2, a main procedure of the processing method in implementations of the present application includes the following steps.

Step 201: Request the service device to determine a to-be-played target multimedia material.

Step 202: Determine availability of the target multimedia material; and perform step 203 if the target multimedia material is available, or perform step 2021 to step 2023 if the target multimedia material is unavailable (for example, the target multimedia material fails to be requested from the service device, or caching of a second multimedia material is uncompleted).

Step 2021: Obtain a locally cached multimedia material.

Step 2022: Perform availability filtering on the locally cached multimedia material, for example, exclude a multimedia material formed by the currently played multimedia material conflicted with said multimedia material.

Step 2023: Select the target multimedia material from a multimedia material remaining after the filtering, and then perform step 203.

Step 203: Replace a playback address of a rendering block on a playback page with a cache address of multimedia material data of the target multimedia material.

Step 204: Update the playback page and play the multimedia material data of the target multimedia material.

Step 205: Re-perform step 201 when a remaining playback time reaches a predetermined execution condition, to request a new to-be-played target multimedia material.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily require a particular execution order to achieve the desired results. In some implementations, multi-task processing and parallel processing can be advantageous.

Figure 3:
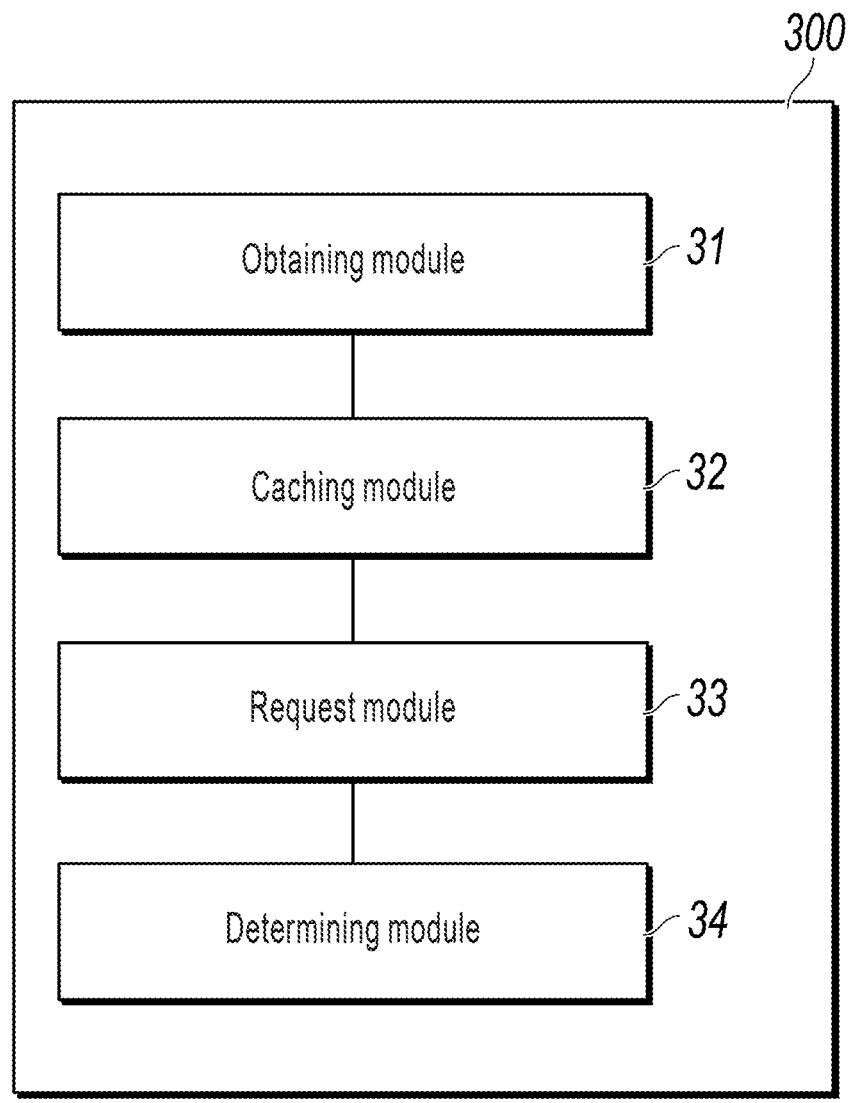
FIG. 3 is a schematic diagram illustrating a logical structure of a multimedia material processing apparatus, according to an implementation of the present specification.

The processing method in the implementations of the present application is described above. Correspondingly, the implementations of the present specification further provide a multimedia material processing apparatus applied to a multimedia playback device. As shown in FIG. 3, the processing apparatus includes: an obtaining module 31, configured to obtain a cache list sent by a service device, where the cache list indicates a to-be-cached multimedia material; a caching module 32, configured to cache the to-be-cached multimedia material; a request module 33, configured to request the service device to determine a to-be-played target multimedia material; and a determining module 34, configured to re-determine the target multimedia material from the cached multimedia material if the target multimedia material fails to be determined or the target multimedia material is successfully determined but the target multimedia material is not cached.

In the implementations of the present application, the service device is responsible for configuring the to-be-cached multimedia material and the to-be-played multimedia material for the multimedia playback device, so that the multimedia playback device can be controlled based on certain policy to more specifically select playback content in a time dimension and a user dimension, thereby improving playback effectiveness. In addition, when the multimedia playback device cannot determine the to-be-played multimedia material by using the service device, or when the to-be-played multimedia material determined by the service device is not cached by the multimedia playback device, the multimedia playback device can independently select the to-be-played multimedia material from the cached multimedia material without help of the service device, so as to ensure that the playback content is not interrupted.

Figure 4:
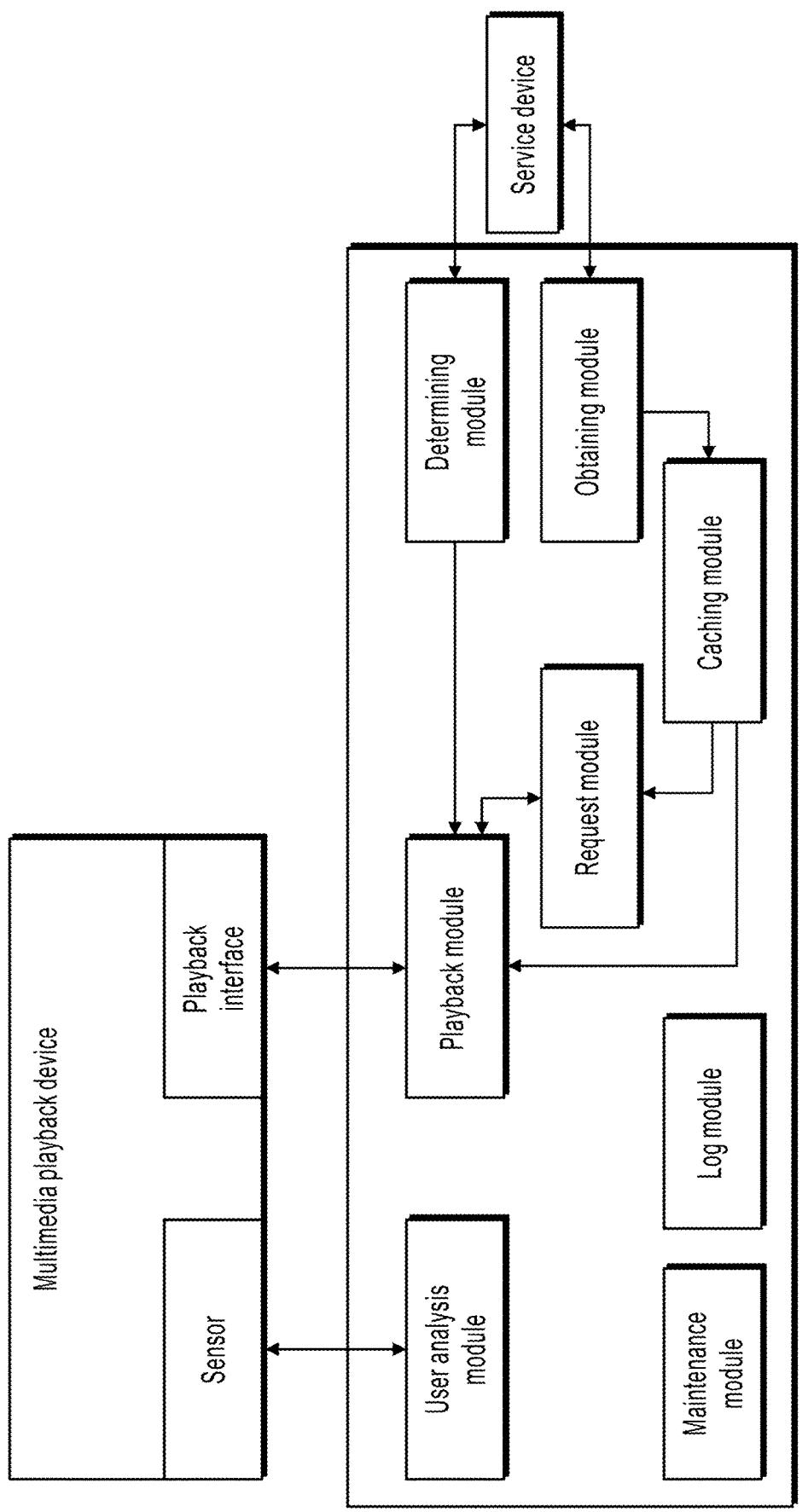
FIG. 4 is a schematic diagram illustrating a logical connection between a multimedia material processing apparatus, a multimedia playback device, and a service device, according to an implementation of the present specification.

A schematic diagram illustrating a logical connection between the processing apparatus, the multimedia playback device, and the service device shown in FIG. 4 is described below in detail.

The processing apparatus in implementations of the present application further includes: a play module, configured to play the target multimedia material when a playback condition of the target multimedia material is satisfied.

The cache list sent by the service device to the multimedia playback device includes download information and playback information of the to-be-cached multimedia material. The caching module downloads multimedia data of the to-be-cached multimedia material based on the download information of the to-be-cached multimedia material, and then associates and caches the multimedia data and the playback information of the to-be-cached multimedia material for the to-be-cached multimedia material.

It is worthwhile to note that the target multimedia material can be obtained through caching by the multimedia playback device based on the cache list sent by the service device. Correspondingly, that the play module plays the target multimedia material can include playing the cached multimedia data of the target multimedia material based on the cached playback information of the target multimedia material.

Specifically, a playback interface of the multimedia playback device is divided into at least one rendering block, and different rendering blocks correspond to different playback areas in the playback interface; and the playback information of the multimedia material is used to indicate a rendering block corresponding to the multimedia data of the multimedia material.

Correspondingly, that the play module plays the target multimedia material is specifically implemented as follows: determining a rendering block corresponding to the target multimedia material based on the cached playback information of the target multimedia material; and setting a playback address of the rendering block corresponding to the target multimedia material to a cache address of the multimedia data of the target multimedia material, so that the rendering block corresponding to the target multimedia material plays the cached multimedia data of the target multimedia material.

Optionally, the playback information of the multimedia material further indicates a conflicted multimedia material formed by the multimedia material conflicted with said multimedia material.

Correspondingly, the determining module is specifically configured to: determine based on the cached playback information of a currently played multimedia material, a conflicted multimedia material set formed by the currently played multimedia material conflicted with said multimedia material; and determine the to-be-played target multimedia material from the cached multimedia material that does not belong to the conflicted multimedia material set. In addition, the obtaining module of the processing apparatus in this implementation of the present application can further obtain an offline list sent by the service device. The offline list indicates a multimedia material to be taken offline. The caching module can disable multimedia data corresponding to the multimedia material to be taken offline in the cached multimedia material.

When obtaining the offline list sent by the service device, the play module can determine whether the multimedia material to be taken offline is the currently played multimedia material. If the multimedia material to be taken offline is the currently played multimedia material, the play module stops playing the multimedia material to be taken offline, and determines the target multimedia material from a cached multimedia material that would not be taken offline.

In addition, the processing apparatus in implementations of the present application further includes: a user analysis module, configured to obtain access information of a wireless network near the multimedia playback device when the multimedia playback device plays the multimedia material; obtain, based on the access information, information about a user accessing the wireless network; and associate and record the user information and the multimedia material played by the multimedia playback device at a time corresponding to the user information.

In addition, the processing apparatus in implementations of the present application further includes: a log module, configured to record a task event of caching the to-be-cached multimedia material, a task event of playing the target multimedia material by the play module, and a task event of obtaining, by the user analysis module, the information about the user accessing the wireless network; and send the task events to the service device.

In addition, the processing apparatus in implementations of the present application further includes: a maintenance module, configured to: monitor the obtaining module, the caching module, the request module, the determining module, the play module, the user analysis module, and the log module, and if one of the modules detected within a predetermined time has no response, pull up the module having no response.

The maintenance module does not relate to processing of a multimedia material-related service, and therefore can be independently executed.

In addition, there possibly be not only one maintenance module, and instead, a primary maintenance module and a secondary maintenance module can be included. A heartbeat monitoring mechanism is established between the primary maintenance module and the secondary maintenance module. Currently, only the primary maintenance module performs monitoring. The secondary maintenance module monitors a heartbeat packet of the primary maintenance module. When heartbeat information indicates that the primary maintenance module is faulty, one of the secondary maintenance modules exchanges can swap with the primary maintenance module to perform a monitoring task.

Figure 5:
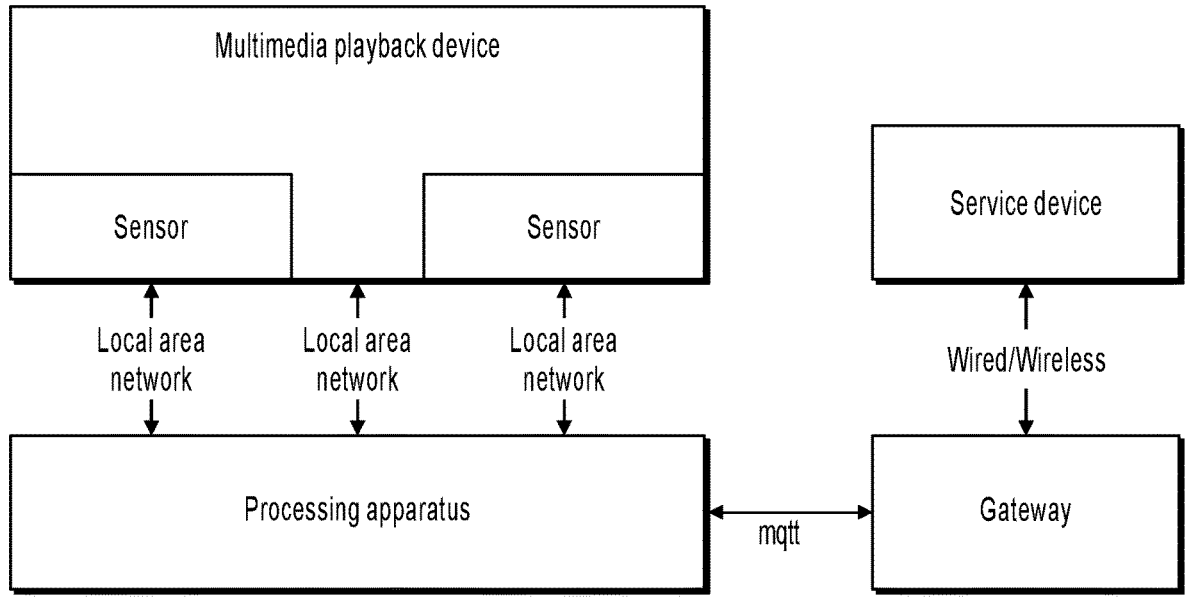
FIG. 5 is a schematic diagram illustrating an actual connection between a multimedia material processing apparatus, a multimedia playback device, and a service device, according to an implementation of the present specification.

In a feasible implementation solution, as shown in FIG. 5, the processing apparatus in implementations of the present application is directly connected to the multimedia playback device by using a local area network, to control the multimedia playback device to play the multimedia material. In addition, the processing apparatus is further directly connected, by using a local area network, to a sensor that is on the multimedia playback device and that is configured to obtain access information of a surrounding wireless network, so as to obtain the access information of the wireless network near the multimedia playback device. In addition, the processing apparatus in this implementation of the present application establishes interaction with the service device by using a gateway. Communication between the processing apparatus and the gateway is implemented based on a Message Queuing Telemetry Transport protocol (MQTT), and communication between the gateway and the service device can be implemented by using a wired network or a wireless network (such as WiFi or a mobile network).

Figure 6:
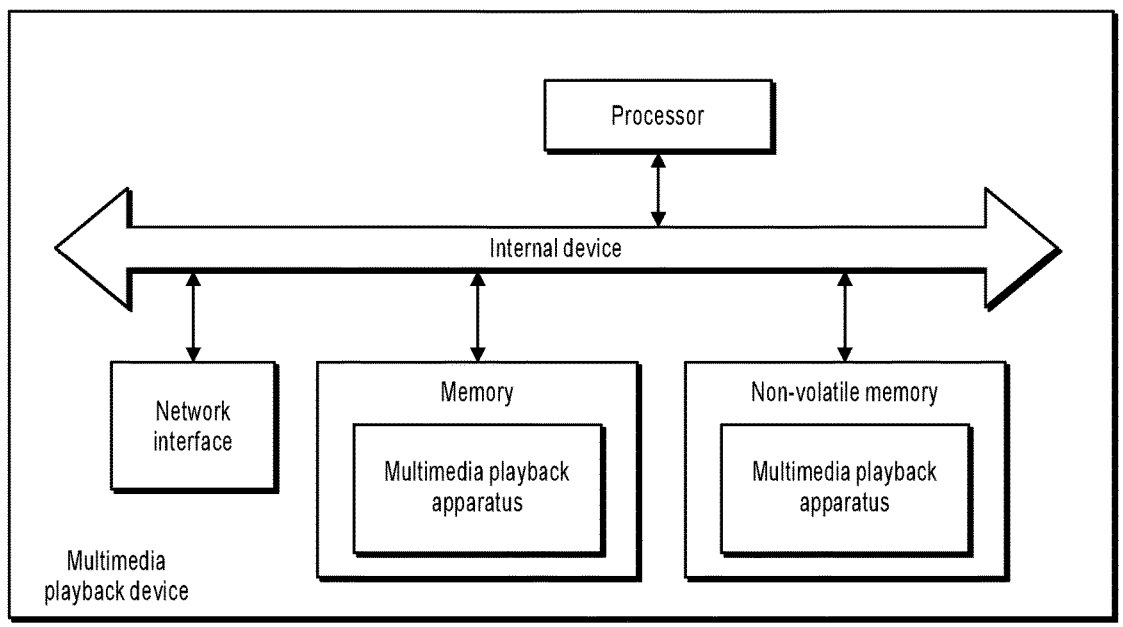
FIG. 6 is a schematic diagram illustrating a hardware structure of a multimedia playback device, according to an implementation of the present specification.

FIG. 6 is a schematic structural diagram illustrating an electronic device, according to some implementations of the present application. Referring to FIG. 6, in terms of hardware, the electronic device includes a processor, and optionally further includes an internal bus, a network interface, and a storage. The storage can include a memory, for example, a high-speed random access memory (RAM), and can further include a nonvolatile memory (nonvolatile memory), for example, at least one magnetic disk storage. Certainly, the electronic device can further include hardware needed by another service.

The processor, the network interface, and the storage can be connected to each other by using the internal bus. The internal bus can be an industry standard architecture (ISA) bus, a peripheral component interconnect (PCI) bus, an extended industry standard architecture (EISA) bus, etc. The bus can be classified into an address bus, a data bus, a control bus, etc. For ease of indication, the bus is indicated by using only one double-headed arrow in FIG. 6. However, it does not mean that there is only one bus or only one type of bus.

The storage is configured to store a program. The program can include program code, and the program code includes a computer operation instruction. The storage can include a memory and a nonvolatile memory, and provide an instruction and data for the processor.

The processor reads a corresponding computer program from the non-volatile memory to the memory for running, and a multimedia playback device is logically formed. The processor executes the program stored in the storage, and is configured to perform the following operations: obtaining a cache list sent by a service device, where the cache list indicates a to-be-cached multimedia material; caching the to-be-cached multimedia material; requesting the service device to determine a target multimedia material, where the target multimedia material is a to-be-played multimedia material; and re-determining the target multimedia material from the cached multimedia material if the target multimedia material fails to be determined or the target multimedia material is successfully determined but the target multimedia material is not cached.

The method performed by the multimedia playback device that is disclosed in the implementation shown in FIG. 1 of the present application can be applied to the processor, or can be implemented by the processor. The processor can be an integrated circuit chip and have a signal processing capability. In an implementation process, steps in the previous methods can be implemented by using a hardware integrated logical circuit in the processor, or by using instructions in a form of software. The processor can be a general purpose processor, including a central processing unit (CPU), a network processor (NP), etc., or can be a digital signal processor (DSP), an application-specific integrated circuit (ASIC), a field programmable gate array (FPGA) or another programmable logic device, a discrete gate or a transistor logic device, a discrete hardware component, etc. The processor can implement or perform the methods, the steps, and the logical block diagrams disclosed in the implementations of the present application. The general purpose processor can be a microprocessor, or the processor can be any conventional processor. The steps of the methods disclosed in the implementations of the present application can be directly performed by a hardware decoding processor, or performed by a combination of hardware and software modules in a decoding processor. The software module can be located in a mature storage medium in the field, such as a random access memory, a flash memory, a read-only memory, a programmable read-only memory, an electrically erasable programmable memory, or a register. The storage medium is located in the storage, and the processor reads information in the storage and completes the steps in the previous methods in combination with hardware in the processor.

The electronic device can further perform the method in FIG. 1, and implement the functions of the multimedia playback device in the implementations shown in FIG. 1, FIG. 2, FIG. 4, and FIG. 5. Details are omitted here for simplicity here in this implementation of the present application.

Certainly, in addition to software implementation, the electronic device in the present application does not exclude another implementation, for example, a logic device or a combination of hardware and software. That is, an execution body of the following processing procedure is not limited to each logical unit, and can also be hardware or a logic device.

Implementations of the present application further provide a computer readable storage medium. The computer readable storage medium stores one or more programs, and the one or more programs include an instruction. When the instruction is executed by a portable electronic device that includes a plurality of application programs, the portable electronic device can perform the method in the implementation shown in FIG. 1, and is specifically configured to perform the following operations: obtaining a cache list sent by a service device, where the cache list indicates a to-be-cached multimedia material; caching the to-be-cached multimedia material; requesting the service device to determine a target multimedia material, where the target multimedia material is a to-be-played multimedia material; and re-determining the target multimedia material from the cached multimedia material if the target multimedia material fails to be determined or the target multimedia material is successfully determined but the target multimedia material is not cached.

In conclusion, the previous descriptions are merely example implementations of the present application, and are not intended to limit the protection scope of the present application. Any modification, equivalent replacement, or improvement made without departing from the spirit and principle of the present application shall fall within the protection scope of the claims in the present application.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a" does not preclude the existence of additional identical elements in the process, method, product or device that includes the element.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

What is claimed is:

1. A computer-implemented method for multimedia playback, comprising:
    receiving, by a multimedia playback device from a multimedia server, a list indicating a plurality of multimedia files;
    caching, by the multimedia playback device, the plurality of multimedia files in a cache storage of the multimedia playback device;
    requesting, by the multimedia playback device from the multimedia server, a primary multimedia file to be played by the multimedia playback device;
    determining, by the multimedia playback device, that the primary multimedia file is unavailable;
    requesting, from the multimedia server, a secondary multimedia file to be played by the multimedia playback device;
    receiving, by the multimedia playback device from the multimedia server, the secondary multimedia file to be played by the multimedia playback device, wherein the secondary multimedia file is determined by the multimedia server based on access information of users of mobile devices to a wireless network associated with the multimedia playback device;
    playing, by the multimedia playback device, the secondary multimedia file when a playback condition of playing the secondary multimedia file is satisfied;
    receiving, by the multimedia playback device, a list of offline files to be deleted from the plurality of multimedia files;
    determining, by the multimedia playback device, that one or more multimedia files in the list of offline files are not currently being played by the multimedia playback device;
    deleting, by the multimedia playback device, the one or more multimedia files based on the list of offline files from the plurality of multimedia files; and
    in response to determining that a multimedia file currently being played at the multimedia playback device is in the list of offline files, stopping, by the multimedia playback device, the multimedia file currently being played and selecting a replacement multimedia file from the plurality of multimedia files that are cached in the multimedia playback device and not in the list of offline files.

2. The computer-implemented method according to claim 1, wherein the playback condition is satisfied when playback of a current multimedia file by the multimedia playback device ends.

3. The computer-implemented method according to claim 1, wherein the list further indicates download information and playback information corresponding to each multimedia file of the plurality of multimedia files, and the method comprising:

downloading, by the multimedia playback device, multimedia data corresponding to the each multimedia file of the plurality of multimedia files based on the download information; and associating, by the multimedia playback device, the multimedia data with the playback information, wherein caching the plurality of multimedia files includes caching the multimedia data with the playback information.

4. The computer-implemented method according to claim 3, wherein a user interface of the multimedia playback device includes a plurality of playback areas, the playback information indicates a playback area of the plurality of playback areas for playing a corresponding multimedia file of the plurality of multimedia files, and the method comprising:

associating, by the multimedia playback device, multimedia data corresponding to the secondary multimedia file with a cache address of the playback area, wherein the secondary multimedia file is played based on retrieving the multimedia data from the cache address.

5. The computer-implemented method according to claim 3, wherein the secondary multimedia file is determined by the multimedia server based on performing:

determining conflicting multimedia files that conflict with a multimedia file currently played by the multimedia playback device; and determining the secondary multimedia file from the plurality of multimedia files that are not included in the conflicting multimedia files.

6. The computer-implemented method according to claim 3, comprising:

sending, by the multimedia playback device, user information and the playback information associated with the multimedia file as task events to the multimedia server.

7. The computer-implemented method according to claim 1, comprising:

requesting, by the multimedia playback device from the multimedia server, a new primary multimedia file when the secondary multimedia file is played by the multimedia playback device for a predetermined amount of time.

8. A computer-implemented system for multimedia playback, comprising one or more computers, and one or more computer memory devices interoperably coupled with the one or more computers and having tangible, non-transitory, machine-readable media storing one or more instructions that, when executed by the one or more computers, perform operations comprising:

receiving, from a multimedia server, a list indicating a plurality of multimedia files;

caching the plurality of multimedia files in a cache storage of a multimedia playback device;

requesting, from the multimedia server, a primary multimedia file to be played by the multimedia playback device;

determining that the primary multimedia file is unavailable;

requesting, from the multimedia server, a secondary multimedia file to be played by the multimedia playback device;

receiving, by the multimedia playback device from the multimedia server, the secondary multimedia file to be played by the multimedia playback device, wherein the secondary multimedia file is determined by the multimedia server based on access information of users of mobile devices to a wireless network associated with the multimedia playback device;

playing the secondary multimedia file when a playback condition of playing the secondary multimedia file is satisfied;

receiving, by the multimedia playback device, a list of offline files to be deleted from the plurality of multimedia files;

determining, by the multimedia playback device, that one or more multimedia files in the list of offline files are not currently being played by the multimedia playback device;

deleting, by the multimedia playback device, the one or more multimedia files based on the list of offline files from the plurality of multimedia files; and in response to determining that a multimedia file currently being played at the multimedia playback device is in the list of offline files, stopping, by the multimedia playback device, the multimedia file currently being played and selecting a replacement multimedia file from the plurality of multimedia files that are cached in the multimedia playback device and not in the list of offline files.

9. The computer-implemented system according to claim 8, wherein the playback condition is satisfied when playback of a current multimedia file by the multimedia playback device ends.

10. The computer-implemented system according to claim 9, wherein the list further indicates download information and playback information corresponding to each multimedia file of the plurality of multimedia files, and the operations comprising:

downloading multimedia data corresponding to the each multimedia file of the plurality of multimedia files based on the download information; and associating the multimedia data with the playback information, wherein caching the plurality of multimedia files includes caching the multimedia data with the playback information.

11. The computer-implemented system according to claim 10, wherein a user interface of the multimedia playback device includes a plurality of playback areas, the playback information indicates a playback area of the plurality of playback areas for playing a corresponding multimedia file of the plurality of multimedia files, and the operations comprising:

associating multimedia data corresponding to the secondary multimedia file with a cache address of the playback area, wherein the secondary multimedia file is played based on retrieving the multimedia data from the cache address.

12. The computer-implemented system according to claim 10, wherein the secondary multimedia file is determined by the multimedia server based on performing:

determining conflicting multimedia files that conflict with a multimedia file currently played by the multimedia playback device; and determining the secondary multimedia file from the plurality of multimedia files that are not included in the conflicting multimedia files.

13. The computer-implemented system according to claim 10, the operations comprising:

sending, by the multimedia playback device, user information and the playback information associated with the multimedia file as task events to the multimedia server.

14. The computer-implemented system according to claim 8, the operations comprising:
- requesting, by the multimedia playback device from the multimedia server, a new primary multimedia file when the secondary multimedia file is played by the multimedia playback device for a predetermined amount of time.

15. A non-transitory, computer-readable medium storing one or more instructions executable by a computer system to perform operations for multimedia playback, the operations comprising:
- receiving, by a multimedia playback device from a multimedia server, a list indicating a plurality of multimedia files;
- caching, by the multimedia playback device, the plurality of multimedia files in a cache storage of the multimedia playback device;
- requesting, by the multimedia playback device from the multimedia server, a primary multimedia file to be played by the multimedia playback device;
- determining, by the multimedia playback device, that the primary multimedia file is unavailable;
- requesting, from the multimedia server, a secondary multimedia file to be played by the multimedia playback device;
- receiving, by the multimedia playback device from the multimedia server, the secondary multimedia file to be played by the multimedia playback device, wherein the secondary multimedia file is determined by the multimedia server based on access information of users of mobile devices to a wireless network associated with the multimedia playback device;
- playing, by the multimedia playback device, the secondary multimedia file when a playback condition of playing the secondary multimedia file is satisfied;
- receiving, by the multimedia playback device, a list of offline files to be deleted from the plurality of multimedia files;
- determining, by the multimedia playback device, that one or more multimedia files in the list of offline files are not currently being played by the multimedia playback device; and
- deleting, by the multimedia playback device, the one or more multimedia files based on the list of offline files from the plurality of multimedia files; and
- in response to determining that a multimedia file currently being played at the multimedia playback device is in the list of offline files, stopping, by the multimedia playback device, the multimedia file currently being played and selecting a replacement multimedia file from the plurality of multimedia files that are cached in the multimedia playback device and not in the list of offline files.

16. The non-transitory, computer-readable medium according to claim 15, wherein the playback condition is satisfied when playback of a current multimedia file by the multimedia playback device ends.

17. The non-transitory, computer-readable medium according to claim 15, wherein the list further indicates download information and playback information corresponding to each multimedia file of the plurality of multimedia files, and the operations comprising:
- downloading, by the multimedia playback device, multimedia data corresponding to the each multimedia file of the plurality of multimedia files based on the download information; and
- associating, by the multimedia playback device, the multimedia data with the playback information, wherein caching the plurality of multimedia files includes caching the multimedia data with the playback information.

18. The non-transitory, computer-readable medium according to claim 17, wherein a user interface of the multimedia playback device includes a plurality of playback areas, the playback information indicates a playback area of the plurality of playback areas for playing a corresponding multimedia file of the plurality of multimedia files, and the operations comprising:
- associating, by the multimedia playback device, multimedia data corresponding to the secondary multimedia file with a cache address of the playback area, wherein the secondary multimedia file is played based on retrieving the multimedia data from the cache address.

19. The non-transitory, computer-readable medium according to claim 17, wherein determining the secondary multimedia file is determined by the multimedia server based on performing:
- determining conflicting multimedia files that conflict with a multimedia file currently played by the multimedia playback device; and
- determining the secondary multimedia file from the plurality of multimedia files that are not included in the conflicting multimedia files.

20. The non-transitory, computer-readable medium according to claim 17, the operations comprising:
- sending, by the multimedia playback device, user information and the playback information associated with the multimedia file as task events to the multimedia server.

21. The non-transitory, computer-readable medium according to claim 15, the operations comprising:
- requesting, by the multimedia playback device from the multimedia server, a new primary multimedia file when the secondary multimedia file is played by the multimedia playback device for a predetermined amount of time.

22. The computer-implemented method according claim 1, wherein the access information comprises user information of the users of the mobile devices.

23. The computer-implemented system according claim 8, wherein the access information comprises user information of users of the mobile devices.

24. The non-transitory, computer-readable medium according claim 15, wherein the access information comprises user information of users of the mobile devices.

* * * * *

UNITED STATES PATENT AND TRADEMARK OFFICE
CERTIFICATE OF CORRECTION

PATENT NO. : 11,330,327 B2
APPLICATION NO. : 17/082826
DATED : May 10, 2022
INVENTOR(S) : Han et al.

It is certified that error appears in the above-identified patent and that said Letters Patent is hereby corrected as shown below:

In the Claims

In Column 18, Line 48, Claim 22, delete "according claim," and insert -- according to claim --, therefor.

In Column 18, Line 51, Claim 23, delete "according claim," and insert -- according to claim --, therefor.

In Column 18, Line 55, Claim 24, delete "according claim," and insert -- according to claim --, therefor.

Signed and Sealed this
Nineteenth Day of July, 2022

Katherine Kelly Vidal
*Director of the United States Patent and Trademark Office*